Feb. 24, 1970 W. L. CALVERT 3,497,026
ELECTRICAL POWER SYSTEM
Filed Dec. 26, 1967
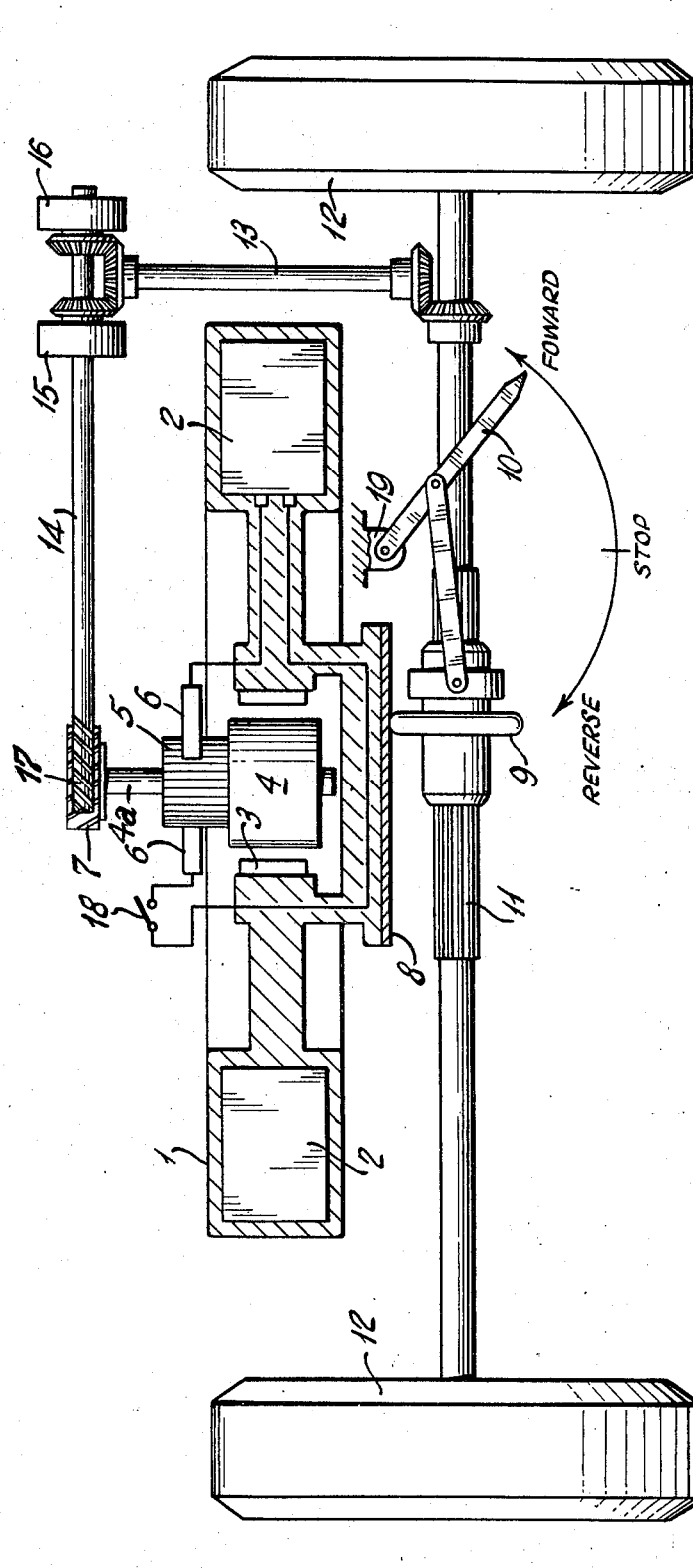
INVENTOR
WILLIAM L. CALVERT
BY
ATTORNEY United States Patent Office 3,497,026
Patented Feb. 24, 1970

3,497,026
ELECTRICAL POWER SYSTEM
William L. Calvert, Westfield, N.J., assignor to Union
Carbide Corporation, a corporation of New York
Filed Dec. 26, 1967, Ser. No. 693,356
Int. Cl. B60k 1/00; H02k 7/02; H02j 7/00
U.S. Cl. 180—65                                    6 Claims

ABSTRACT OF THE DISCLOSURE

An electrical flywheel power system is provided for machines, particularly a propulsion system for vehicles. A battery provides long term power for the machine's steady operation while the flywheel provides high rate power for machine acceleration and kinetic energy recovery and storage when the machine decelerates.

FIELD OF THE INVENTION

This invention relates to electrical power systems, particularly flywheel power systems.

THE PRIOR ART

Power systems for machines generally, including vehicles, are frequently electrical motor or combustion engines. If the latter, toxic polluting gases are given off as exhaust. The large number of combustion engine vehicles such as autos and trucks in use today, as is well known, are substantial contributors to air pollution particularly in urban areas. Electrically powered systems have long been used in stationary machines e.g. in factories and attention has recently been directed toward producing an electrically powered vehicle to significantly reduce air pollution problems and the like. Battery powered vehicles have already appeared as prototypes for future transportation. However, a battery system of large storage capacity is required to provide a vehicle such as a 4-passenger car with even a relatively short range. Moreover, the power system for the electric vehicle should also be capable of high current discharge capacity which is needed when high loads are applied to a vehicle, such as for hill climbing, rapid acceleration and the like. However in the typical battery high current drain is achieved only at the expense of battery life and storage capacity unless the vehicle is to be encumbered with excessive battery weight. Accordingly, the power system selected is a compromise between storage capacity and high current discharge ability. Thus it has been necessary to accept either low acceleration rates and hill climbing rates or reduced operating range in the electric vehicle heretofore available.

Generally the balance has been resolved in favor of storage capacity so that the typical 4-passenger electric auto presently available has a range of about 50 miles and relatively low horsepower e.g. about 14 HP.

Another problem common to vehicles in general, particularly electric vehicles is the loss of kinetic energy thereof when the vehicle decelerates or stops. Even if some of the kinetic energy can be charged back to a battery, as current, the amount of energy recovered is limited because batteries in general have a limited charging rate and a large measure of the onrushing kinetic energy is lost.

However the electric vehicle is most needed for city driving where the air pollution problems are most acute. Yet the stop-go nature of city driving takes a heavy toll on the battery power system because of the kinetic energy of the vehicle that is lost when the vehicle is slowed or brought to a stop, plus the drain on the battery required to start and accelerate the vehicle. The acceleration and hill climbing necessarily take place at a slow tedious rate in view of the low horsepower of the vehicle as described above. It will be recognized, that the above-described energy loss and accelerating difficulties apply to stationary electrical machines as well as to the above electric vehicles.

Heretofore a portable electric power system that provides high storage capacity and also high rate power delivery has not been known.

Accordingly, there has now been discovered an electric power system that provides both high storage capacity and high rate power delivery as well as conserving kinetic energy loss when the machine driven by the system is slowed or brought to a halt. A portable power flywheel electric system is provided having high weight and size economy. The power system of the invention also provides an electric vehicle having satisfactory acceleration rates at an unreduced operating range.

SUMMARY

Broadly the present invention provides an electric power system comprising a flywheel rotatably mounted on a support, a motor-generator mounted on the support and rotatably connected to a flywheel, and an electric power source mounted on said support and connected to the motor-generator.

In a particular embodiment of the invention there is provided a vehicle propulsion system comprising, a vehicle carriage mounted on at least one wheel, a flywheel rotatably mounted on said carriage, a motor-generator mounted on said carriage and rotatably connected to said flywheel, an electric power source mounted on said carriage and connected to said motor-generator and a transmission system for rotatably connecting said flywheel and said wheel.

DESCRIPTION

The invention will become more apparent from the following detailed specification and drawings in which:

The single figure is a schematic elevation view in partial section showing an embodiment of the electric power system of the invention connected to a pair of wheels.

Referring now to the drawing, a flywheel-battery vehicle propulsion system is shown wherein the flywheel 1 contains storage battery 2, which provides most of its weight. A motor-generator, consisting of field poles 3, armature 4, commutator 5, and brushes 6 is built into the hub of the flywheel. A switch 18 externally actuated by means (not shown) provides the electrical connection between battery and motor-generator. A mechanical variable speed transmission is shown, which consists of friction disc 8 mounted on the flywheel, and friction wheel 9 which, by means of control lever 10 pivotably mounted to chassis 19 may be positioned along splined shaft 11 to impart the desired motion to the wheels 12 i.e. forward, stop, reverse. Brakes (not shown) can also be employed to slow the vehicle. A mechanical feed-back system, consisting of shaft 13, shaft 14 and a mechanical rectifier, e.g., opposed overrunning clutches 15 and 16 are provided to cause the armature of the motor-generator to rotate in a direction counter to flywheel rotation and at a speed proportional to vehicle velocity. Linking feed-back shaft 14 and armature 4 is a worm gear reducer formed by worm 17, which is situated at one end of shaft 14 and worm gear 7, which is connected to armature 4 by way of armature shaft 4a. The thread angle of the worm 17 is such that the worm 17 can turn the worm gear 7, but not vice versa, i.e., the feed-back system can drive the armature 4, but the reducer does not permit the armature 4 to drive the feed-back shaft 14, which would result in the armature 4 spinning freely because the overrunning clutches 15 and 16 offer little resistance to counter-rotation. The reducer, accordingly, serves to maintain the armature speed in proportion to the speed of the feed-back system e.g. shafts 13 and 14, which latter speed can vary from stationary to increasing r.p.m. values. Without a check on the armature speed, it could be as indicated, run freely, and the motor-generator could apply little or no torque to the flywheel. The armature speed can be checked by various other systems, mechanical, electrical and hydraulic or the armature 4 can be maintained in a stationary position in a power system as discussed below.

The motor-generator has such electrical characteristics as will cause it always to seek a fixed rotational speed of field relative to armature, i.e., it will seek an r.p.m. differential standard between field and armature. Any reduction in r.p.m. differential below standard, such as slowing of the flywheel, slowing of the armature or both will result in motor action tending to accelerate the flywheel; while any increase in r.p.m. differential such as speeding of the flywheel, armature or both will result in generator action tending to charge the battery or other power source, and decelerate the flywheel. Since the motor-generator tends to hold the relative speed of flywheel to armature, i.e., r.p.m. differential, constant, it is apparent that the flywheel will be seeking its maximum speed when the vehicle and the armature are stationary and some lower speed when the vehicle is in motion. This will be true whether the vehicle is moving forward or backward because of the above mechanical rectifier having overrunning clutches 15 and 16. It is seen, therefore, that the mechanical feedback system serves two valuable purposes: first, the total kinetic energy of vehicle and flywheel tends to remain constant so that the flywheel will always have the capacity to absorb all of the kinetic energy of the vehicle, as the vehicle is slowed by down shifting, without exceeding a safe flywheel speed; and, second, the relative speed of flywheel to armature will always be maintained at a level which will not subject the battery to a high current drain or charging rate. For further clarification, it may be noted that, without the feedback system (that is, if the armature were locked), if the speed control lever 10 were suddenly adjusted to increase the vehicle speed, thereby causing a decrease in flywheel speed, the motor would then strive to restore the flywheel to its original speed causing a high drain rate on the battery, which would, in turn, require continuing readjustment of the speed control lever. If the vehicle were brought to maximum speed, the flywheel would continue to tend to its original speed and could not then readily absorb kinetic energy released as the vehicle was slowed, by down-shifting, without possibly exceeding a safe flywheel speed or without subjecting the battery to an excessively high charging rate. With the feedback system, there is an approximately fixed control lever setting and flywheel speed corresponding to each desired vehicle velocity with the lowest sustained flywheel speed occurring when the vehicle moves at maximum velocity under its own power.

Since the motor will be low powered relative to the inertia of the flywheel, and since the power source will be designed for maximum energy storage capacity rather than for high current drain, it will probably be necessary to introduce current-limiting resistors (not shown) in the armature circuit during initial start-up. Such starting equipment would be located in the flywheel hub with switches centrifugally actuated in the proper sequence. Only the starting switch 18 will require external accessibility to the driver.

A list of details not shown in the drawing, for the sake of simplicity, includes such items as bearings, suitable mounting and housing for the flywheel, and differential and reduction gearing between the variable speed transmission and the wheels. The type of transmission indicated would probably be suitable for a small two or three passenger vehicle. There are, however, many combinations of mechanical, electrical, and hydraulic transmission systems from which a suitable selection can be made for each size and power class of vehicle. The hydraulic transmission system can offer the opportunity to use a pressure relief valve to dissipate energy in excess of that which could safely be transmitted to the flywheel during a "crash stop." Except for such emergency conditions, optimum conservation of energy would be the major criterion in the selection of the transmission equipment. It should be noted that a number of schemes, not discussed here, are available for giving an unconventional drive system the desired degree of "conventional feel" for the driver. For instance, a spring and dash pot system interposed between control lever 10 and the accelerator pedal would give the system shown a conventional feel.

It should be noted that in up-shifting, the flywheel drives the vehicle wheels while in down shifting, the wheels drive the flywheel.

Thus it can be seen that the above described electrical power system as applied to vehicles has in the storage battery, which, as used herein, represents all other portable power sources, long term power delivery for extensive vehicle range and also has, in the flywheel, a means for rapid high power delivery to provide the vehicle with rapid acceleration when moving or from a standard start. The flywheel of the power system also provides rapid recovery and conservation of kinetic energy when the above vehicle is decelerated by down shifting causing the flywheel to speed up. Should the flywheel speed up sufficiently to exceed the r.p.m. differential standard then, as indicated above, the motor-generator acts as a generator and charges the battery for further conservation of energy.

Thus the electric power system of the invention serves as a highly efficient propulsion system for a vehicle. There is provided a package of minimum weight (particularly where the storage battery is mounted in the flywheel of the system) having an electrical energy storage system for long term low rate energy delivery and recovery, in combination with a kinetic energy storage system for short term, high rate energy delivery and recovery with an efficient transmission system connecting flywheel and vehicle wheel or wheels.

In sum, a flywheel cannot store a significant amount of total energy compared with the battery. However, it can, with no difficulty, store sufficient energy to accelerate a vehicle from rest to full speed. Furthermore, the rate of acceleration of the vehicle will be limited only by the strength of the transmission interposed between the flywheel and the drive wheels. Similarly, the rate at which kinetic energy may be transferred from the vehicle back into a flywheel will, again, be limited only by the strength of the transmission. The present invention thus places the major burden of rapid acceleration and deceleration on the flywheel system, so that the battery and its operating conditions may be optimized for maximum energy storage and life. Thus in terms of an electric vehicle, one can obtain, for example, one hundred horsepower momentary performance out of a ten horsepower electric power plant.

As previously indicated the motor-generator is characterized by a r.p.m. differential standard between armature and field winding. In a preferred embodiment, the flywheel is rotatably connected to the field and the vehicle wheels are rotatably connected via a feed-back system to the armature. The armature rotates at a speed proportionate to the wheel speed and in a direction opposite to that of the flywheel. When the vehicle is stopped the armature is stationary and the flywheel is driven by the motor-generator at its rated, relatively high, speed. When the vehicle accelerates (by up-shifting) kinetic energy is transmitted to the wheels from the flywheel, which slows. The motor-generator would then strive to bring the flywheel back up to its former rated speed, if the armature were still stationary. However the armature being rotated in proportion to the wheel speed in an opposite direction, the flywheel need only be brought up to a lesser speed to maintain the r.p.m. differential standard. When the vehicle is cruising at a desired speed, the flywheel is moving at lower than rated speed being driven by the motor-generator which is drawing current from the battery. When the vehicle is moving at maximum speed on a level course, the flywheel will be turning at a minimum sustained speed. When the vehicle is decelerated by down shifting, kinetic energy is transmitted to the flywheel, which speeds up. The armature will slow as the wheels decelerate. Should the flywheel speed up sufficiently to exceed the characteristic r.p.m. differential, the motor-generator charges the battery or other power source. The effort of thus generating electricity will cause braking action on the flywheel preventing it from exceeding a safe speed and bringing the flywheel back to the rated r.p.m. differential. As the vehicle and armature further slow the flywheel speed rises toward rated speed. The relative speed of flywheel, armature and vehicle wheels, at equilibrium conditions on a level course, is summarized in the following table. The figures chosen are for purposes of illustration only and not to limit the relative speeds given or the ratios thereof.

TABLE I

| | R.p.m. | |
|---|---|---|
| Flywheel | Armature | Vehicle wheels |
| 500 | 0 | 0 |
| 450 | 50 | 50 |
| 400 | 100 | 100 |
| 350 | 150 | 150 |
| 300 | 200 | 200 |
| 250 | 250 | 250 |

The above table illustrates the relative speeds of the above vehicle components where there is feed-back to the armature from the vehicle wheels and the r.p.m. differential standard of the motor-generator employed is 500 r.p.m.

The following table similarly illustrates the relative speeds of the above vehicle components, at equilibrium conditions on a level course, where there is no feed-back to the armature, which is maintained stationary. The figures chosen are illustrative only.

TABLE II

| | R.p.m. | |
|---|---|---|
| Flywheel | Armature | Vehicle wheels |
| 500 | 0 | 0 |
| 500 | 0 | 100 |
| 500 | 0 | 200 |
| 500 | 0 | 300 |
| 500 | 0 | 400 |
| 500 | 0 | 500 |

It can be seen that, there being no feed-back to the armature, the motor-generator strives to maintain the flywheel at rated speed. There is thus more of a drain on the battery and the flywheel is less able to absorb kinetic energy when the vehicle speeds down hill or is decelerated by down-shifting, without driving the flywheel to excessive speeds and charging the battery at a high rate. However there are undoubtedly applications for an electric power system and vehicle, without feed-back, such as described above and they are included within the scope of the present invention.

It will be recognized that the relative speeds of the components given in Tables I and II above are but two examples. The many gearing and power transmission arrangements presently known in the art can be employed within the present invention to drive the above components, flywheel, armature and vehicle wheels (or stationary machine components including shafts) at various relative speeds as desired. Flywheel and armature elements can counter-rotate, co-rotate or one of the elements can be stationary.

Where the electric power system of the invention is loaded, not by down-shifting but by outside force, as where a vehicle embodying the invention is decelerated by brake application or encounters an up-hill grade, there is a loss of kinetic energy which is not recovered by the flywheel. Slowing the vehicle wheels by braking slows the armature and the flywheel unless provision is made to unload or partially release the flywheel, as by a neutral lever, and kinetic energy is lost which must be replaced from the battery and motor-generator when the vehicle is reaccelerated. When the car starts up a grade, kinetic energy is drawn from the flywheel to the vehicle wheels, slowing the flywheel and again drawing current from the battery to assist the vehicle up the hill and to bring the flywheel back up to sufficient speed to restore and maintain the characteristic r.p.m. differential of the motor-generator.

When the vehicle starts down hill the armature and flywheel will both speed up as the vehicle wheels accelerate and when the characteristic r.p.m. differential is exceeded the motor-generator will commence charging the battery and the effort of the motor-generator in generating electricity will cause the flywheel to act to some extent as a brake. During this descent the wheels can be slowed by down-shifting the transmission which however will increase the flywheel speed further with the above result of charging the battery. Brakes can also be applied to the vehicle to insure, if necessary, that the flywheel speed and vehicle speed do not become excessive with however, the commensurate loss of some of the kinetic energy attained by the vehicle.

The function of the battery, for a vehicle having a power system such as shown in the single figure is herein noted when the vehicle encounters accelerating and decelerating forces. When the vehicle slows due to down-shifting the wheels drive the flywheel and the battery is usually charged. But when the vehicle slows due to external forces, such as brakes or an uphill grade, the flywheel and armature both tend to slow and the battery discharges to speed the flywheel. Similarly when the vehicle accelerates due to up-shifting, the flywheel drives the wheels and tends to draw power from the battery (via the motor-generator). But when the vehicle accelerates, due to a downhill course, both armature and flywheel speed up tending to charge the battery. It will be recognized that other feed-back and transmisison systems than those shown in FIGURE 1 produce other effects on the vehicle power source when a vehicle is subjected to the above described accelerating and decelerating forces.

The electric power system of the invention is suitable for use in connection with or for driving, virtually any machine, mobile, such as the vehicles discussed above or stationary. Thus the power system of the invention can serve to power a movable or stationary machine, to power a component part thereof or to serve in a reserve capacity. The vehicles contemplated include virtually any conveyance capable of propulsion on land or in subterranean reaches, or water, ice and snow under water, in the air, in space and in general, on or through solids, liquids and gases. Preferred are vehicles having one or more wheels for travel on road or rail, such as cycles, autos, buses, trucks, trains and the like. These vehicles can all be powered to some extent by the portable electric flywheel power of the invention. The electrically powered vehicles of the invention are particularly suitable to stop-go conditions of urban driving where air-pollution free vehicles are most needed.

The flywheel-electric power system of the invention is also highly suitable for powering a gyroscope. The ratings of various existing power units such as batteries and miniature motors suggests that a gyroscope wheel, with batteries mounted thereon e.g. on or in its rim and a motor connected to the wheel, preferably integrated into its hub, could be kept spinning for a period of two to ten days on a single charge of the batteries. Gyros used for stabilization or instrumentation in deep sea or space vehicles, where space and weight limitations are critical, should derive special benefits from such an integrated package. As a toy or educational tool, there can be imagined a low cost item, consisting largely of injection molded parts, which would spin, not for seconds or minutes as with present string-powered gyros, but for hours or days.

As indicated above, stationary machines can also be readily powered by the power system of the invention. Thus the flywheel and armature, instead of being connected to vehicle wheels, can be connected to shafts, gears, levers, pistons, belts or any other moveable machine parts. Calender machines, printing presses, sewing machines are but as insignificant sample of the wide variety of machines readily imaginable which can be powered by the electric power system of the invention. The flywheel serves particular use in supplying start-up power to the machines as well as storing kinetic energy when the machines are slowed or stopped. The flywheel also can act as a brake when the r.p.m. differential of the motor-generator employed is exceeded. The discussion of the power system characteristics of the vehicles of the invention, discussed at length above, applies also to stationary machines, particularly with reference to the effects of external braking of the machine, down-shifting, up-shifting, charging and discharging the battery and the like.

The motor-generator is preferably mounted coaxially within the flywheel as shown, for example, in the single figure. However, the motor-generator can be mounted in any other desired location with respect to the flywheel. Thus the motor-generator can be mounted outside of the flywheel and rotatably connected thereto. Moreover it is not required that the field element be connected to the flywheel; the armature can be connected to the flywheel instead, if desired.

The transmission of power from the motor-generator to a machine, moveable or stationary, can be from a face of the flywheel, an example of which is shown in FIGURE 1, axially, as where a shaft is connected to one or both of the motor-generator elements or peripherally, where power is transmitted from the edge of the flywheel and/or edge of the armature of extension thereof. The flywheel can have a smooth, rough or machined surface suitable for the transmission of power. It can have a smooth peripheral surface, a rough surface, e.g. suitable for engaging a belt drive or the flywheel can have a ridged and grooved edge or face suitable for engaging transmission systems including gears.

As indicated, the flywheel has a gyroscopic effect which can be neutralized, if desired, by employing two counter-rotating flywheels. On the other hand, serious consideration should be given to utilizing this effect to improve the stability of a machine, particularly the stability and riding qualities of a vehicle.

It follows that one or more flywheels can comprise the electric power system of the invention in axial or other array to serve stability and power requirements, which flywheels counter rotate, co-rotate or combination thereof, at the same or different speeds.

As indicated above, the flywheel-electric power system operates from portable power when employed in moveable machines and from portable or stationary power when employed in stationary machines. Generally the power source is a storage battery. However, other power sources available can be employed such as fuel cells, solar batteries and the like.

The power source is preferably mounted on the flywheel, including within the periphery of the flywheel, for weight economy. However, the power source can be mounted elsewhere i.e., in proximity to the flywheel or motor-generator as desired.

Battery performance or life might be improved by the draining of liquid electrolyte from the battery during periods of non-use e.g., by providing a storage chamber therefor proximate the flywheel axis. Thus, auxiliary power can be provided to start the flywheel initially and provision made for flooding the main battery by centrifugal force and for draining the battery by gravity when the flywheel comes to rest. Where fuel cells on the flywheel are employed, again, advantage should be taken of the centrifugal forces for control purposes or enhancement of performance.

The flywheel assembly can be made of any of the various relatively rigid structural materials, metal, including steel, iron, wood, plastic and the like or combinations thereof depending on durability and weight considerations. The flywheel can further be apertured or solid as required.

What is claimed is:

1. An electric power system comprising: a flywheel rotatably mounted on a support; a motor-generator mounted on said support and having a field element and an armature element; said flywheel being rotatably connected to one of said elements; said elements being mounted to rotate relative to each other and to tend to maintain a r.p.m. differential standard therebetween; electric power source means connected to said motor-generator and adapted to discharge to said motor-generator when said r.p.m. differential falls below said standard and to be charged by said motor-generator when said r.p.m. differential exceeds said standard; and the flywheel-connected element and said flywheel are connected to a machine drive system which is, in turn, connected through a feed-back linkage to the other element so that a change in speed of the driven machine will cause an inversely proportional change in rotational velocity of said other element, thereby reducing the variance in r.p.m. differential between said elements.

2. The electric power system of claim 1, wherein said other element is rotatably connected to said driven machine through mechanical rectifier means so that the direction of rotation of said other element remains the same regardless of the direction of rotation of said driven machine.

3. The electric power system of claim 2, wherein said other element is the armature element.

4. A vehicle propulsion system comprising: a vehicle carriage mounted on at least one wheel; a flywheel rotatably mounted on said carriage; a motor-generator mounted on said carriage and having a field element and an armature element; said flywheel being rotatably connected to one of said elements and being mounted to rotate relative to the other of said elements and to tend to maintain a r.p.m. differential standard therebetween; a power source connected to said motor-generator and adapted to discharge to said motor-generator when said r.p.m. differential falls below said standard tending to speed up said flywheel and adapted to be charged by said motor-generator when said r.p.m. differential exceeds said standard tending to slow said flywheel; variable drive transmission means connecting said flywheel-connected element and said flywheel to said wheel; and a motion feed-back system from said wheel to said other element whereby the speed sought by said flywheel is inversely proportional to the velocity of said wheel, thereby reducing the variance in r.p.m. differential between said elements.

5. The vehicle propulsion system of claim 4, wherein said other element is rotatably connected to said wheel through mechanical rectifier means so that the direction of rotation of said other element remains the same regardless of the direction of rotation of said wheel.

6. The vehicle propulsion system of claim 5, wherein said other element is the armature element.

References Cited

UNITED STATES PATENTS

| | | | |
|---|---|---|---|
| 473,871 | 4/1892 | Gardner | 180—55 |
| 516,917 | 3/1894 | Coleman | 310—115 |
| 554,138 | 2/1896 | Neubauer et al. | 290—50 |
| 653,264 | 7/1900 | Scott. | |
| 888,405 | 5/1908 | Lavigne | 180—54 |
| 1,495,347 | 5/1924 | Neubauer | 180—21 |
| 1,736,551 | 11/1929 | Schou | 318—161 XR |
| 2,511,412 | 6/1950 | Myrmirides | 310—115 XR |
| 2,672,566 | 3/1954 | Heins. | |
| 3,182,742 | 5/1965 | Dow | 180—65 XR |

FOREIGN PATENTS 867,738    9/1941    France.

LEO FRIAGLIA, Primary Examiner

MILTON L. SMITH, Assistant Examiner

U.S. Cl. X.R.

310—121; 318—139, 161; 320—61; 322—4